United States Patent [19]
Springgate et al.

[11] Patent Number: 6,024,163
[45] Date of Patent: Feb. 15, 2000

[54] INVESTMENT CASTING BRITTLE, REACTIVE MATERIALS

[75] Inventors: Mark Edwin Springgate, Portland, Oreg.; Douglas Gene Nikolas, Battleground, Wash.; David H. Sturgis, Boring; Mehrdad Yasrebi, Clackamas, both of Oreg.

[73] Assignee: Precision Castparts Corp., Portland, Oreg.

[21] Appl. No.: 08/779,641

[22] Filed: Jan. 7, 1997

[51] Int. Cl.⁷ .................................. B22C 1/02; B22C 9/02
[52] U.S. Cl. .......................... 164/519; 164/517; 164/518; 164/361
[58] Field of Search .................... 164/519, 518, 164/517, 361

[56] References Cited

U.S. PATENT DOCUMENTS

| | | | |
|---|---|---|---|
| 4,787,439 | 11/1988 | Feagin | 164/519 |
| 4,989,664 | 2/1991 | Roth | 164/369 |
| 4,998,581 | 3/1991 | Lane et al. | 164/517 |
| 5,299,619 | 4/1994 | Chandley et al. | 164/493 |
| 5,335,717 | 8/1994 | Chin et al. | 164/519 |
| 5,464,797 | 11/1995 | Yasrebi et al. | 501/103 |

OTHER PUBLICATIONS

J.A. Oti and K.O. Yu "Production Processing of Investment Cast Complex Shaped NiA1 Single Crystal Airfoils," *The Minerals, Metals, & Materials Society*, pp. 505–512 (1993).

*Primary Examiner*—Patrick Ryan
*Assistant Examiner*—I.-H. Lin
*Attorney, Agent, or Firm*—Klarquist Sparkman Campbell Leigh & Whinston, LLP

[57] ABSTRACT

Investment casting shells, methods for their manufacture and methods for casting metals and alloys using such shells are disclosed. One feature of the shells is that the facecoat plus interior backup layers are purposefully designed to have substantially similar coefficients of thermal expansion to the seal dip layers. This helps reduce the occurrence of dimensional casting defects caused by differential thermal expansions of the layers comprising the shell. One embodiment of such a shell comprises a facecoat, plural interior backup layers and plural intermediate backup layers wherein at least one of the plural intermediate backup layers comprises a material capable of undergoing a volumetric transformation during cool down, and wherein the seal-dip layers have a coefficient of thermal expansion that varies from the coefficient of thermal expansion of the facecoat and interior backup layers by less than about 10 percent. A particular embodiment of the method is useful for investment casting aluminides, particularly TiAl, using a shell having an alumina facecoat.

67 Claims, 1 Drawing Sheet

INVESTMENT CASTING BRITTLE, REACTIVE MATERIALS

FIELD OF THE INVENTION

This invention concerns investment casting brittle, reactive materials, such as intermetallic alloys, using shells particularly designed for casting such materials.

BACKGROUND OF THE INVENTION

Investment casting is a process for forming articles, often referred to as castings, from metals and alloys. Molten metals or alloys are poured into shells having an internal cavity shaped in the form of a desired article and allowed to solidify into castings. The shell is formed by serially applying layers of materials, such as ceramics, on wax or polymeric "patterns" formed in the shape of the desired article. The innermost layer of the shell, i.e., the first layer deposited on the pattern, is referred to as the "facecoat". The facecoat contacts the molten metal during the casting process. Subsequent layers that are deposited over the facecoat are referred to as "backup layers". Final "seal dip" layers are applied over the underlying backup layers.

Investment casting brittle metals and alloys, particularly reactive materials such as the intermetallic alloys, has proved difficult. Intermetallic alloys are mixtures of two or more metals that form crystal structures different from any of the constituent metals. The intermetallic alloys generally undergo a ductile-to-brittle transformation during "cool down," the period during which the metal or alloy cools in the shell after pouring, or after the metal solidifies inside the shell. Conventional shells historically used in the investment casting process can cause intermetallic castings to crack. Intermetallic alloys also may react with the facecoat during the casting process, particularly at the elevated temperatures at which such metals and alloys are cast. This reaction may cause surface defects, and render the casting useless.

However, intermetallic alloys also have physical properties that make them useful for a number of applications. NiAl intermetallic alloys, for example, have lower densities, higher thermal conductivities, higher melting temperatures and greater oxidation resistance than the known nickel-based superalloys. See Aimone et al.'s U.S. Pat. No. 5,297,615 (Aimone).

Aimone discloses a method for casting intermetallic alloys using shells having a sacrificial backup layer. The sacrificial layer is formed using ceramic materials stuccoed with what Aimone refers to as nonsinterable materials, such as graphite, plastics or other vaporizable materials. The stucco materials are vaporized to form internal crushable voids in one or more of the backup layers. This forms a sacrificial layer, or perhaps plural such layers, which ostensibly reduces the occurrence of defects in the intermetallic casting. However, the volume of the material forming the sacrificial layer does not itself undergo a volumetric reduction.

Sacrificial layers weaken the entire shell, which may cause the shell to leak after molten metal or alloy is poured into the shell. This obviously affects the quality of the casting and wastes raw material. Furthermore, shells having sacrificial backup layers may not maintain the correct dimensions throughout the casting process, which is referred to as dimensional instability. If the shell cannot maintain the desired dimensions, the casting formed using such shell cannot have the correct dimensions. The dimensional stability of investment casting shells may not present a problem when casting small parts. However, shell dimensional stability becomes more important as the complexity of the casting increases and/or the thickness of the casting decreases.

Commercially viable techniques for investment casting intermetallic alloys and other brittle but useful materials are limited. As a result, the investment casting industry still requires reliable shells and methods for casting brittle, reactive materials.

SUMMARY OF THE INVENTION

The present invention provides investment casting shells, methods for their manufacture and methods for casting metals and alloys, particularly brittle, reactive materials, using the shells. One feature of the shells is that the facecoats and seal dip layers may be purposefully designed to have "substantially similar" coefficients of thermal expansion.

Shells in accordance with the invention also can have plural backup layers comprising at least one interior backup layer and at least one intermediate backup layer. The facecoat and interior backup layer or layers define a portion of a shell having a first coefficient of thermal expansion. Such shells preferably, but perhaps not necessarily, include as many seal dip layers as facecoat and interior backup layer or layers combined. The seal dip layers define a portion of a shell having a second coefficient of thermal expansion that is substantially similar to the first coefficient of thermal expansion. "Substantially similar" means that the coefficient of thermal expansion of the facecoat, or facecoat plus interior backup layers, varies from the coefficient of thermal expansion of the seal-dip layer or layers by from about 0 to about 10 percent.

Shells in accordance with the invention also may include plural backup layers wherein at least one of the backup layers comprises a material capable of undergoing a volumetric transformation during cool down. In other words, the volume of the backup layer decreases during cool down, which helps separate the shell from the casting. Examples of materials suitable for undergoing such a volumetric transformation may be selected from the group consisting of fused silica, cristobalite, quartz, tridymite, zirconia, and mixtures thereof. Good results have been obtained using fused silica as the flour capable of undergoing a volumetric transformation. Silicon carbide stucco has proved suitable as a stucco for the fused silica flour layer. One embodiment of a shell having these features comprises (a) at least one shell layer comprising a material capable of undergoing a volumetric transformation during casting or cool down, (b) underlying layers that underlie the at least one shell layer capable of undergoing a volumetric transformation during casting or cool down, the underlying layers defining a first portion of the shell, and (c) overlying layers that overlie the at least one shell layer capable of undergoing a volumetric transformation during casting or cool down. With such shells, the overlying shell layers define a second portion of the shell wherein the first and second portions of the shell have substantially similar coefficients of thermal expansion. Compared to conventional shells, shells having substantially similar coefficients of thermal expansion as discussed above and/or which include materials capable of undergoing a volumetric transformation during casting or cool down reduce the occurrence of dimensional and surface defects when casting brittle metals and alloys.

Another embodiment of an investment casting shell made in accordance with the present invention is particularly useful for casting TiAl. Such shells include a facecoat comprising an alumina flour, plural backup layers, and at least one seal dip layer. A surprising feature of such shells is that alumina is used as the facecoat flour. Prior to the present invention, the investment casting industry believed that alumina was unsuitable as a flour for forming shell facecoats for casting TiAl. This has proved incorrect. At least one of the plural backup layers, and typically plural such backup layers, may comprise a flour capable of undergoing a volumetric transformation during cool down. Shells for casting TiAl may further comprise at least one interior backup layer and at least one intermediate backup layer wherein the facecoat and interior backup layer or layers define a portion of a shell having a first coefficient of thermal expansion. These shells also preferably, but perhaps not necessarily, have as many seal dip layers as facecoat and interior backup layer or layers combined. The seal dip layers define a portion of a shell having a second coefficient of thermal expansion that is substantially similar to the first coefficient of thermal expansion.

Another embodiment of a shell useful for investment casting metals and alloys also is described. Such shells generally comprise a facecoat, plural backup layers comprising at least one interior backup layer and at least one intermediate backup layer, and preferably as many seal dip layers as the facecoat and interior backup layer or layers combined. The facecoat and interior backup layer or layers define a portion of a shell having a first coefficient of thermal expansion. The seal dip layers define a portion of a shell having a second coefficient of thermal expansion that is substantially similar to the first coefficient of thermal expansion. Furthermore, the at least one intermediate backup layer, and perhaps plural such layers, comprises a material capable of undergoing a volumetric transformation during cool down. Facecoat materials for such shells can be selected from the group consisting of graphite, alumina, the rare earth metal oxides, doped rare earth metal oxides, such as those disclosed in Yasrebi et al.'s U.S. patent Ser. No. 08/312,694 and now issued as U.S. Pat. No. 5,643,844, entitled "Method for Stabilizing Ceramic Suspensions," incorporated herein by reference, and mixtures thereof. Preferably, suitable facecoat materials are selected from the group consisting of graphite, alumina, zirconia, thoria, yttria, fused yttria, calcined yttria-vanadia, yttria-zirconia, yttria-alumina, and mixtures thereof. Such shells also generally include seal dip layers comprising, a flour selected from the group consisting of alumina, zircon, zirconia, quartz, silica, yttria, titania, and mixtures thereof.

Good castings of brittle metals and alloys have been obtained using a shell having (1) a facecoat consisting essentially of an alumina flour and alumina stucco, (2) plural interior backup layers consisting essentially of alumina flour and alumina stucco, the facecoat and plural interior backup layers defining a portion of a shell having a first coefficient of thermal expansion, (3) plural intermediate backup layers consisting essentially of a material capable of undergoing a volumetric transformation during cool down, such as fused silica flour and silicon carbide stucco, and (4) as many seal dip layers as the facecoat plus interior backup layers combined. The seal dip layers generally consist essentially of alumina or zircon flour and define a portion of the shell having a second coefficient of thermal expansion. The first coefficient of thermal expansion and the second coefficient of thermal expansion vary by from about 0 to about 10 percent, typically from about 1 to about 7 percent, preferably from about 1 to about 5 percent, and even more preferably from about 1 to about 3 percent.

Several embodiments of methods for investment casting metals and alloys, particularly TiAl, and castings made by the embodiments also are described. The embodiments of methods for investment casting metals and alloys include the step of providing shells having the features discussed above. Molten metals or alloys are placed inside the shells, and thereafter allowed to solidify. The shells are then separated from the solidified metals or alloys to provide castings.

DETAILED DESCRIPTION OF THE PREFERRED EMBODIMENTS

I. GENERAL DISCUSSION

Figure 1:
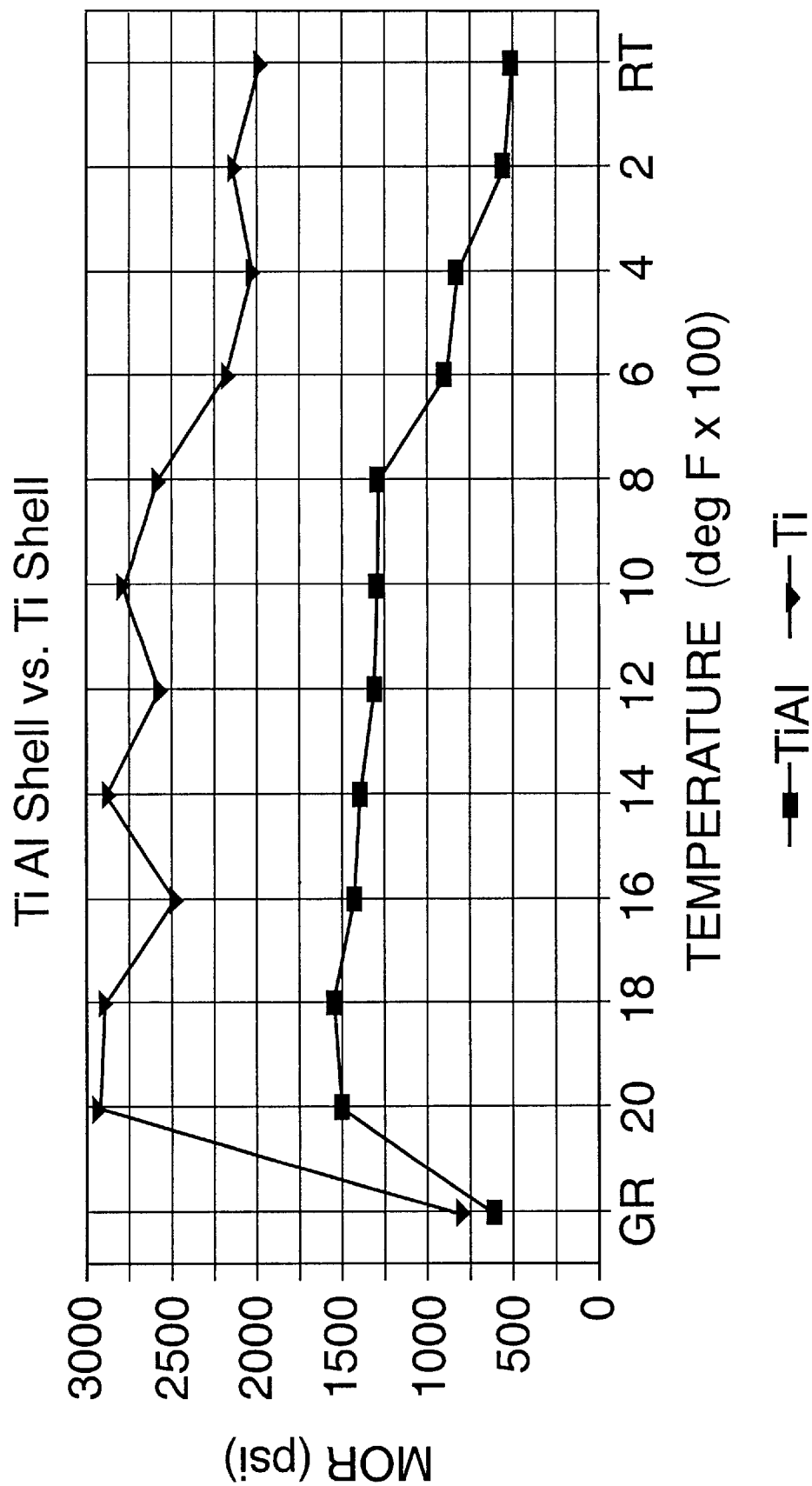
FIG. 1 is a graph showing temperature (° F.) and modulus of rupture (MOR) that compares the strength of shells made in accordance with the present invention to a conventional ceramic shell made from zircon and fused alumina stucco.

The challenge in casting brittle, reactive metals and alloys is to form shells having facecoats that do not react with the metals or alloys being cast, are sufficiently strong to receive and retain metal or alloys at casting temperatures, and yet are not so strong as to cause metals or alloys to crack during cool down. The following paragraphs discuss features of shells made in accordance with the present invention that allow for casting brittle, reactive metals and alloys. It should be understood, however, that such shells also can be used to cast other metals and alloys, if desired. Examples of methods for casting such metals and alloys also are provided, as is data which compares shells made according to the present invention, and castings made using such shells, to those made using conventional shells and methods.

"Brittle" as used herein is defined in terms of the percent elongation an article can experience before breaking. Generally, "brittle" refers to materials having an elongation of from about 0 to about 5 percent, and more typically from about 0 to about 2 percent. Intermetallic alloys are a class of brittle materials that can be cast using the shells and methods disclosed herein. Examples of intermetallic alloys include the aluminides, such as NiAl and TiAl. Silicides, such as molybdenum disilicide, are another group of brittle materials that can be cast using the methods disclosed herein. As a result, the metals and alloys for which the present investment casting shells and methods are particularly suited are selected from the group consisting of brittle, reactive metals and alloys, particularly the intermetallic alloys and silicides, and even more particularly the aluminides.

The general steps used to form shells include: (1) forming the pattern by conventional methods, such as by machining a metal blank for forming a pattern, injection moulding a pattern or by forming the pattern using stereolithography; (2) forming an aqueous or nonaqueous suspension comprising a material, referred to as a flour, that is suitable for forming the facecoat; (3) applying the facecoat to the pattern, such as by immersing the pattern into the suspension; (4) placing material onto the facecoat to help form a cohesive structure about the pattern, such material being referred to as "stucco"; (5) serially applying a plurality of backup layers over the facecoat using an appropriate flour and stuccoing some or all of such layers and perhaps stuccoing some or all of the seal dip layers except for the outermost seal dip; (6) applying seal-dip layers to the pattern and underlying layers; (7) autoclaving, heating or chemically treating the shell to remove the pattern; (8) firing the shell to form a hard structure capable of receiving and holding molten metals or alloys; (9) introducing molten metals or alloys into the shell and allowing the metals or alloys to solidify to form castings; (10) removing the shell from about the casting in a process referred to as "breakout"; and (11) removing surface defects from the casting.

II. MATCHING COEFFICIENTS OF THERMAL EXPANSION

One reason for the occurrence of surface defects in castings and defects caused by dimensional instabilities in shells is that layers of the shells have different coefficients of thermal expansion. The occurrence of such defects is exacerbated when casting thin walls, i.e. castings having wall thicknesses of 0.25 inch or less.

Shells made in accordance with the present invention can be designed so that the facecoat layer and seal-dip layer have substantially similar coefficients of thermal expansion. For example, alumina could be used to form the facecoat and the seal-dip layer or layers. The thermal expansion of such layers, since they would be made from the same material, would be substantially identical.

A more typical situation is to have a facecoat layer coated with several "interior backup layers" and several "intermediate backup layers" which overlie the interior backup layers. The intermediate backup layers generally comprise a flour different from that used to form the interior backup layers. In this situation, the facecoat plus interior backup layers define a portion of a shell having a first coefficient of thermal expansion. The number of seal dip layers is then preferably, but not necessarily, made to equal the sum of the facecoat layer plus interior backup layers. The seal dip layers define a portion of the shell having a second coefficient of thermal expansion. The first coefficient of thermal expansion is then made to be substantially similar to the second coefficient of thermal expansion by appropriate selection of flour and stucco materials.

As used herein, "substantially similar" is defined to mean that the coefficients of thermal expansion referred to above do not differ by more than about 10 percent, i.e., from about 0 to about 10 percent. Shells having the referred to coefficients of thermal expansion that are virtually identical, i.e., the coefficients of thermal expansion differ by about 0 percent, produce acceptable castings. The 10 percent upper limit to the definition of "substantially similar" was determined by first establishing what dimensional defect would be acceptable in a thin walled casting, such as a 0.001 inch defect. The percent difference between the referred to coefficients of thermal expansion that resulted in this "acceptable dimensional" defect was mathematically determined to be about 10 percent. However, the coefficients of thermal expansion typically differ only by about 1 to about 7 percent, preferably only by about 1 to about 5 percent, and even more preferably by from about 1 to about 3 percent. If the thermal expansion of the facecoat differs from that of the seal-dip layer by more than about 10 percent, then the facecoat may be forced to bow relative to the internal portion of the shell initially occupied by the pattern, and hence also relative to the outer surface of the casting. If such bowing occurs, the result is a dimensional defect. In other words, the shell is not dimensionally stable during the cool down process.

III. BACKUP LAYERS FOR VOLUMETRIC TRANSFORMATION

Shells made in accordance with the invention also can be designed to have intermediate backup layers that help separate the shell from the casting during the breakout process. The flours and/or stuccos used to form such intermediate backup layers undergo a volumetric transformation during the cool down process, which helps separate the shell from the casting. As used herein, "volumetric transformation" refers to materials that undergo a molecular rearrangement during cool down from a first molecular structure having a first volume for a unit portion of the material to a second molecular structure having a second volume for a unit portion of the material that is smaller than the first volume. For example, if the material used to form the intermediate backup layers is crystalline, the unit cell for the first crystalline structure has a larger volume than the volume of the unit cell for the second crystalline structure that forms during cool down.

Shells made in accordance with the present invention can be designed to have one or both of the features recited in Sections I and II of this application. One embodiment of a shell having both features comprises (a) at least one shell layer comprising a material capable of undergoing a volumetric transformation during casting or cool down, (b) underlying layers that underlie the at least one shell layer capable of undergoing a volumetric transformation during casting or cool down, the underlying layers defining a first portion of the shell, and (c) overlying layers that overlie the at least one shell layer capable of undergoing a volumetric transformation during casting or cool down. The overlying shell layers define a second portion of the shell wherein the first and second portions of the shell have substantially similar coefficients of thermal expansion.

It will be appreciated that a variety of materials can be used to form shells that do exhibit one or both of these features. The materials that can be used for forming the shells are discussed below; however, the selection of materials for forming a particular shell for a particular casting must be accomplished by keeping in mind the properties desired in the investment casting shell being produced.

IV. CASTING TiAl

Aluminides are an important class of brittle, intermetallic alloys that can be cast using shells and methods in accordance with the present invention. A surprising result was the discovery that alumina can be used as a facecoat material for casting TiAl. Prior to the present invention, the state of the art for casting titanium aluminides was to use zirconia or rare-earth metal oxides as the refractory material for forming the facecoat. However, these materials are expensive. Alumina was not considered useful, prior to the present invention, for casting TiAl because it was believed that TiAl reacted too readily with alumina. This has proved incorrect. As a result, particularly preferred embodiments of shells useful for casting aluminides in accordance with the present invention have facecoats comprising, or consisting essentially of, alumina.

V. MAKING INVESTMENT CASTING SHELLS

1. Facecoats

Titanium aluminides have been cast using zirconia, yttria or rare-earth metal oxides as a refractory material for forming the facecoat. These materials also can be used to form the facecoat of shells useful for casting intermetallic or other brittle alloys. However, these materials are expensive, and shells having facecoats made from these materials also may increase the occurrence of surface defects in brittle alloys.

With respect to casting intermetallic alloys, and particularly the aluminides, working embodiments of the present invention generally have used alumina flour for forming the facecoat. Alumina was chosen for several reasons. First, alumina is less expensive than zirconia, yttria or other rare earth metal oxides. Moreover, alumina also reduces the occurrence of surface defects in castings relative to other materials that have been used as shell facecoat materials for casting aluminides.

Other materials, such as graphite, are known by the inventors to be useful for forming suitable facecoats. As a result, facecoat materials for shells made in accordance with the present invention can be selected from the group consisting of graphite, metal oxides, and mixtures thereof, particularly from the group consisting of graphite, alumina, the rare earth metal oxides, doped rare earth metal oxides, and mixtures thereof, and even more particularly from the group consisting of graphite, alumina, zirconia, thoria, yttria, fused yttria, calcined yttria-vanadia, yttria-zirconia, yttria-alumina, and mixtures thereof. It should be understood that the shell layers can include other materials than those listed as being materials suitable for forming each layer. As a result, the facecoat can comprise, or consist essentially of, the materials listed as being suitable for forming the shell layers.

Flours generally considered useful for forming shells in accordance with the present invention have a mean particle size of from about 9 to about 14 μm. Flour particle size becomes an important consideration when casting the aluminides. For example, titanium aluminide flows for a longer period of time than titanium under similar casting conditions. This means that titanium aluminide is more likely to flow into the pores of the investment casting shell than is titanium. The pore size of the investment casting shell is, at least in part, determined by the particle size of the flour material. If the pores are too large, then the titanium aluminide can flow into the pores and cause rough surface positive defects in the casting.

2. Facecoat Stuccos

Selecting a stucco material also is an important consideration, and depends upon a number of factors, including the layer being stuccoed, the cost of the stucco material, and the physical characteristics desired in each layer being stuccoed. Generally, but not necessarily, the flour used to form each particular layer of the shell also can be used as a stucco for such layer, although stuccos generally have a larger mean particle size than flours used to form the shell layers. Facecoat stuccos considered useful for forming shells in accordance with the present invention generally have mean particle size distributions of from about 70–120 grit.

Any stucco material that is compatible with the facecoat materials, which helps form cohesive shells, and which allows for forming good castings can be used. More particularly, stucco materials suitable for the facecoat can be selected, without limitation, from the group consisting of alumina, zirconia, zircon (zirconium silicates), fused yttria, fused yttria-zirconia, fused yttria-alumina, calcined yttria, rare earth metal oxides, and mixtures thereof. Good results have been obtained using shells having alumina as the facecoat stucco material.

3. Interior Backup Layers

Investment casting shells typically have plural backup layers. For example, working embodiments of the present invention have formed shells having from about six total layers to about fifteen total layers, with a typical total number of layers being about twelve. The number of interior backup layers that are used to form a particular shell depends on a number of factors, including (1) the particular material being used, (2) the physical characteristics desired in the shell, (3) the metal or alloy being cast and (4) the thickness of the desired shell. For example, if the facecoat and the interior backup layers are made from the same, relatively expensive material, such as zirconia, then the number of interior backup layers made using such material is kept to a minimum, such as two or three such backup layers. On the other hand, if the facecoat and interior backup layers are made from the same, but relatively inexpensive material, such as alumina, then the number of backup layers may be increased.

Each of the backup layers may be formed from the same material. Alternatively, two or more materials may be used to form the backup layers, or all of the backup layers may be formed from different materials. The typical situation is to form shells using at least two different materials to form the backup layers. Generally, although not necessarily, the first two to five "interior backup layers" (i.e., those closest to the interior of the shell) include the same flour that is used to form the facecoat. The flour used to form the interior backup layers may be selected from the group consisting of alumina, zircon, zirconia, fused yttria-zirconia, fused yttria-alumina, graphite, fused silica, and mixtures thereof.

4. Stuccos for Interior Backup Layers

The stucco that is used for the interior backup layers also may vary, and is largely dependent upon the flour used to form the backup layer. A partial list of stuccos useful for stuccoing the interior backup layers includes alumina, zirconia, yttria-zirconia, zircon, and mixtures thereof.

5. Intermediate Backup Layers

As stated above, shells made in accordance with the invention can include intermediate backup layers that are designed to help separate the shell from the casting during the breakout process. The materials used to form such intermediate layers undergo volumetric transformations during cool down to help separate the shell from the casting. Materials suitable for forming the intermediate backup layers can be selected, without limitation, from the group consisting of fused silica, cristobalite, quartz, tridymite, zirconia, and mixtures thereof.

Working embodiments of shells made in accordance with the present invention generally have used fused silica as the material for forming the intermediate backup layers. Fused silica is transformed to crystalline silica during the firing and casting process. As crystalline silica cools it undergoes a volumetric transformation from the β crystalline phase to the α crystalline phase. The α crystalline phase has a contracted molecular structure relative to the molecular structure of the β crystalline phase. Thus, the intermediate backup layers contract during cool down. This helps separate the shell from the casting once it solidifies. Shells which included materials capable of undergoing volumetric transformations during cool down have been separated from the castings by hand, as opposed to conventional shells which must be separated from the casting using mechanical methods.

6. Stuccos for Intermediate Backup Layers

The stucco for the intermediate backup layers also is important. Without limitation, stuccos useful for stuccoing the intermediate backup layers can be selected from the group consisting of silicon carbide, fused silica, and mixtures thereof. Currently, the preferred stucco for the intermediate backup layers is silicon carbide.

7. Seal Dip

After the interior and intermediate backup layers are deposited on the pattern, seal-dips are applied to the pattern and over the underlying backup layers. As stated above, shells can be made so that the facecoat layer, and generally the facecoat plus interior backup layer or layers, has a coefficient of thermal expansion substantially similar to the seal-dip layer (or layers). Thus, the appropriate selection of the flour for forming the seal dip depends upon the materials used to form the facecoat and interior backup layers. In general, materials considered useful for forming the seal-dip layer or layers may be selected, without limitation, from the group consisting of metal oxides, more typically from the group consisting of alumina and the rare earth metal oxides, and even more typically from the group consisting of alumina, zircon, zirconia, quartz, silica, yttria, titania, fused yttria-zirconia, fused yttria-alumina, and mixtures thereof.

Working embodiments of shells made in accordance with the invention generally have used alumina flours or zircon flours for the seal-dip layer. Alumina and zircon flours can be applied to the pattern using a slurry having a colloidal silica or an ethyl silicate binder.

8. Seal Dip Stuccos

The outermost seal dip layer generally does not include stucco. However, the underlying seal dip layers may include a stucco material. Stuccos for these seal dip layers can be selected, for example and without limitation, from the group consisting of alumina, zirconia, yttria-zirconia, zircon, and mixtures thereof.

VI. EXAMPLES

The following examples are intended to illustrate certain features of the present invention. The examples should not be construed to limit the present invention to the particular features described.

Example 1

This example describes the formation of a slurry that has been used to apply a facecoat consisting primarily of alumina to a pattern. An alumina flour was obtained from Aluchem (Aluchem alumina flour AC99-325). The alumina flour (78.10 percent based on the total weight of the slurry produced) was added to about 1.77 weight percent deionized water containing 17.89 weight percent colloidal silica (Dupont LUDOX SM) with stirring using a high-shear mixer operating at about 3,000 RPM, thereby forming an aqueous suspension of alumina. Thereafter, 2.15 weight percent latex (Dow 460 NA), 0.07 weight percent surfactant (NOPCOWET C50) and 0.01 weight percent defoamer (Dow Corning 1410) were added to the alumina suspension with continued stirring. This suspension was used to apply the facecoat to a pattern.

Example 2

This example describes a second slurry that is useful for applying to a pattern a facecoat material consisting primarily of fine alumina, as opposed to the coarser alumina flour described in Example 1. Fine alumina was added to the slurry to improve strength and density.

17.15 weight percent colloidal silica (Dupont LUDOX SM) was added to about 1.7 weight percent deionized water with stirring using a high-shear mixer operating at about 3,000 RPM. 4.13 weight percent fine alumina (Alcoa A-16SG) was added to the silica-deionized water mixture, followed by 74.88 weight percent alumina flour (Aluchem AC99-325) with continued stirring. This formed an aqueous suspension of alumina and fine alumina. Thereafter, 2.06 weight percent latex (Dow 460 NA), 0.07 weight percent surfactant (NOPCOWET C50) and 0.01 weight percent defoamer (Dow Corning 1410) were added to the alumina suspension with continued stirring. This suspension was used to apply facecoats to patterns.

Example 3

This example describes the formation of a fused-silica slurry useful for applying to coated patterns intermediate backup layers consisting primarily of fused silica. 31.6 weight percent colloidal silica (DuPont LUDOX SM) and 64.0 weight percent 290 mesh fused silica (Minco MINSIL 290) were stirred together using a high-shear mixer operating at about 3,000 RPM, thereby forming an aqueous suspension of fused silica having a colloidal silica binder. Thereafter, 3.3 weight percent latex (Dow 460 NA), 0.12 weight percent surfactant (NOPCOWET C50) and 0.02 weight percent defoamer (Dow Corning 1410) were added to the fused silica suspension with continued stirring. This suspension was used to apply intermediate backup layers to coated patterns.

Example 4

This example describes the formation of a zircon slurry useful for applying to coated patterns seal dip layers consisting essentially of zircon flour. 20.96 weight percent colloidal silica (DuPont LUDOX SM) and 58.5 weight percent fine zircon flour (Atochem, 600 mesh) were stirred together using a high-shear mixer operating at about 3,000 RPM, thereby forming an aqueous suspension of zircon having a colloidal silica binder (DuPont LUDOX SM). Thereafter, 20.96 weight percent alumina sand and 0.03 weight percent anionic surfactant (NOPCOWET C50) were added to the zircon suspension with continued stirring. This suspension was used to apply seal dip layers to coated patterns.

Example 5

This example describes a method for forming a shell having an alumina facecoat, two alumina interior backup layers, seven fused silica intermediate backup layers with silicon carbide stucco, and three zircon seal dips. An alumina facecoat suspension was made according to the procedure described in Example 1. A wax pattern was immersed in the facecoat slurry, removed from the slurry and allowed to drain. 70 grit alumina stucco was applied to the wet facecoat layer, and the alumina facecoat with alumina stucco was dried at 70° F. for twelve hours.

The slurry-coated pattern was then dipped into a slurry comprising 325 mesh alumina, 70 grit alumina stucco in either ethyl silicate or colloidal silica (binder). The pattern was allowed to drain, and was then covered with 46 grit alumina stucco. This step of dipping in an alumina slurry and stuccoing with alumina was repeated to apply the interior backup layers to the coated pattern. Thus, the facecoat plus interior backup layers provided three shell layers.

The slurry-coated pattern was then immersed in an intermediate backup layer slurry comprising 290 mesh fused silica flour in a colloidal silica binder. The slurry was allowed to drain from the pattern. The wet pattern was then coated with 46 grit silicon carbide stucco. The dipping, draining and stuccoing steps were repeated six times.

The coated pattern was then immersed in a slurry comprising 600 mesh zircon, 70 grit alumina stucco and aqueous colloidal silica. The coated pattern was allowed to drain and then was coated with 46 grit alumina stucco. A second seal-dip layer was formed by repeating the slurry dipping and stuccoing steps. A final seal dip comprising zircon was applied by immersing the slurry coated pattern into a zircon seal-dip slurry. Thus, three total seal-dip layers were applied to the coated pattern.

The shell was autoclaved to remove the pattern, leaving an internal cavity in the shape of a bar, and then fired. The final shell was used to cast test bars from TiAl. Such bars were visually free of surface and dimensional defects.

Shells made according to Example 5 also have been used to cast thin walled articles from TiAl. Such articles also were visually free of surface and dimensional defects. In contrast, thin walled articles cast from TiAl using conventional shells were not free of surface and dimensional defects. For example, conventional shells produced by the inventors for casting thin walled articles had regions wherein the shell walls bowed so significantly inwardly at the thin portion of the casting so as to touch. This touching effectively prevents liquid metals or alloys from flowing into this region of the shell, i.e., such bowing prevents the formation of a shell cavity for receiving molten metal or alloy. Thin, plate-like castings made from conventional shells therefore had regions with virtually no metal. Instead, the casting tapered from its correct edge dimensions inwardly to the middle of the casting where virtually no metal was seen.

Example 6

This example describes a method for forming a shell having an alumina facecoat, two alumina interior backup layers, seven fused silica intermediate backup layers and three alumina seal-dip layers. An alumina facecoat suspension was made according to the procedure described in Example 1. A wax pattern was then immersed in the facecoat slurry, removed from the slurry and allowed to drain. 70 grit alumina stucco was then applied to the wet facecoat layer, and the alumina facecoat with alumina stucco was dried at 70° F. for twelve hours.

The slurry-coated pattern was dipped into a slurry comprising 325 mesh alumina, 70 grit alumina stucco in ethyl silicate binder (binder also can be infiltrated into the shell by immersing the shell into a binder slurry). The pattern was allowed to drain, and was then covered with 46 grit alumina stucco. The step of dipping in an alumina slurry and stuccoing was repeated. As a result, an alumina facecoat plus two alumina interior backup layers were applied to the pattern.

The slurry-coated pattern was then immersed in an intermediate backup layer slurry comprising 290 mesh fused silica flour and a colloidal silica binder. The slurry was allowed to drain from the pattern. The wet pattern was coated with 46 grit silicon carbide stucco. The dipping, draining and stuccoing steps were repeated six times to produce seven intermediate backup layers.

The pattern having a facecoat, two interior backup layers and six intermediate backup layes was then immersed in a slurry comprising 325 mesh alumina flour, 70 grit alumina stucco and a colloidal silica or ethyl silicate binder. The coated pattern was allowed to drain and was then coated with 46 grit alumina stucco. The slurry dipping followed by stuccoing was continued to form one more layer. A final seal dip was then applied by immersing the slurry coated pattern into a slurry comprising alumina, thereby forming a shell having three alumina seal dip layers.

The shell was used to cast test bars from TiAl that were visually free of surface and dimensional defects. Thin walled castings made using such shells also were visually free of surface and dimensional defects.

Example 7

This example describes a method for forming a shell having an alumina facecoat, fused silica intermediate backup layers, and a zircon seal dip. An alumina facecoat suspension was made according to the procedure described in Example 1. A wax pattern was immersed in the facecoat slurry, removed from the slurry and allowed to drain. 70 grit alumina stucco was applied to the wet facecoat layer, and the alumina facecoat with alumina stucco was dried at 70° F. for twelve hours.

The slurry-coated pattern was then immersed in an intermediate backup layer slurry comprising 290 mesh fused silica flour in a colloidal silica binder. The slurry was allowed to drain from the pattern. The wet pattern was coated with 46 grit silicon carbide stucco. The dipping, draining and stuccoing steps were repeated six times.

The slurry coated pattern was then immersed in a slurry comprising 600 mesh zircon, 70 grit alumina stucco and aqueous colloidal silica. The coated pattern was allowed to drain. This example therefore provided a shell having an alumina facecoat, six intermediate backup layers and a seal dip. It should be apparent that shells made according to Example 7 do not have interior backup layers, and that for some shells mae in accordance with the present invention the distinction between interior backup layers and intermediate backup layers does not apply.

Test bars visually free of surface and dimensional defects were cast from TiAl using the shell.

Example 8

This example describes a method for forming a shell having a yttria facecoat, two alumina interior backup layers, four fused silica backup layers, two zircon layers having alumina stucco and a zircon seal dip. 8.0 weight percent colloidal silica (DuPont LUDOX SM) and 1.0 weight percent tetraethyl ammonium hydroxide (Southwestern Analytical Chemicals) were added to 4.2 weight percent deionized water with stirring using a high-shear mixer operating at about 3,000 RPM to form a suspension. 80.5 weight percent yttria flour (Treibacher Anermet) and 4.0 weight percent titanium dioxide (DuPont, R-900) were added to the suspension with continued stirring. The yttria flour (80.5 percent based on the total weight of the slurry produced) containing thereby forming a suspension of yttria in water. Thereafter, 2.0 weight percent latex (Dow 460 NA), 0.2 weight percent surfactant (NOPCOWET C50), and 0.1 weight percent defoamer (Dow Corning 1410) were added to the yttria suspension with continued stirring. This suspension was used to apply the facecoat to a pattern. 70 grit alumina stucco was applied to the wet facecoat layer, and the yttria facecoat with alumina stucco was then dried at 70° F. for twelve hours.

Two interior backup layers were then applied to the facecoat-coated pattern into an alumina slurry formed as stated in Example 1. 46 grit alumina was used as stucco material for the alumina interior backup layers.

The coated pattern was then immersed in an intermediate backup layer slurry comprising 290 mesh fused silica flour in a colloidal silica binder. The slurry was allowed to drain from the pattern. The wet pattern was coated with 46 grit silicon carbide stucco. The dipping, draining and stuccoing steps were repeated four times, although these steps could be continued for many more times if desired.

The slurry coated pattern was then immersed in a slurry comprising 325 mesh zircon, 70 grit alumina stucco and aqueous colloidal silica. The coated pattern was allowed to drain and was coated with 46 grit alumina stucco. The dipping followed by stuccoing was continued to form two layers. A final seal dip comprising zircon was applied by immersing the slurry coated pattern into a zircon seal-dip slurry. Test bars were cast from TiAl using the shell.

Example 9

This example illustrates the matching of thermal expansions for the facecoat and for the outer layer. A shell was made according to Example 5. Such shell had an alumina facecoat with alumina stucco, two alumina interior backup layers with alumina stucco, and two zircon outer layers with a zircon seal dip. The coefficient of thermal expansion for the alumina facecoat and two interior backup layers was about $7.7 \times 10^{-6}/°$ C. The seal dip layers had a coefficient of thermal expansion of about $7.6 \times 10^{-6}/°$ C. Thus, the percent difference between the coefficient of thermal expansion for the facecoat and interior backup layers relative to the coefficient of thermal expansion of the seal dip layers for this particular shell was 7.7−7.6=0.1/7.7=about 1.3 percent. Such shells have been used successfully for casting intermetallic alloys.

VII. SHELL STRENGTH

FIG. 1 illustrates how the strength (modulus of rupture; MOR) of shells made according to the present invention compares with a conventional shell made for casting pure titanium. The conventional shell was made using −600 mesh zircon stuccoed with 46 grit fused alumina. The modulus of rupture was done in three-point bending. "GR" in FIG. 1 refers to green (i.e., not fired) samples, while "RT" refers to the fired samples cooled down to room temperature. Temperatures provided on the X axis are in Fahrenheit.

FIG. 1 clearly shows that the modulus of ruptures for shells made by the present invention are lower at all temperatures tested as compared to the conventional shell. This means that shells made in accordance with the present invention can be used to cast brittle alloys more efficiently than standard shells because the shells of the present invention do not exert as much force during cool down on the casting as do conventional shells. In fact, thin walled castings made using the conventional shell were unacceptable, as discussed above, whereas thin walled articles cast with shells made in accordance with the present invention were visually free of surface and dimensional defects. The present shells also have sufficient strength to prevent leaking during the casting process.

Having illustrated and described the principles of the present invention with reference to several preferred embodiments, it should be apparent to those of ordinary skill in the art that the invention may be modified in arrangement and detail without departing from such principles. We claim as our invention all such modifications which fall within the scope of the following claims.

We claim:

1. An investment casting shell for casting TiAl, comprising:

a facecoat comprising an alumina flour; and plural backup layers comprising at least one interior backup layer and at least one intermediate backup layer, the facecoat and the at least one interior backup layer defining a portion of a shell having a first coefficient of thermal expansion, the shell also having seal dip layers that define a portion of a shell having a second coefficeint of thermal expansion that is substantially similar to the first coefficient of thermal expansion.

2. The shell according to claim 1 wherein at least one of the plural backup layers comprises a material capable of undergoing a volumetric transformation during cool down.

3. The shell according to claim 1 wherein at least one of the plural backup layers comprises a flour capable of undergoing a volumetric transformation during cool down, the flour being selected from the group consisting of fused silica, cristobalite, quartz, tridymite, zirconia, and mixtures thereof.

4. The shell according to claim 1 wherein plural backup layers comprise a material capable of undergoing a volumetric transformation during cool down.

5. The shell according to claim 1 wherein at least one of the plural backup layers comprises fused silica flour and silicon carbide stucco.

6. The shell according to claim 1 having plural interior backup layers, and wherein the interior backup layers comprise an alumina flour, the at least one intermediate backup layer comprises a material capable of undergoing a volumetric transformation during cool down and the seal dip layers comprise a material selected from the group consisting of alumina and zircon flour.

7. The shell according to claim 6 wherein the at least one intermediate backup layer comprises fused silica flour and silicon carbide stucco.

8. The shell according to claim 1 having plural interior backup layers, and wherein the interior backup layers consist essentially of an alumina flour, the at least one intermediate backup layer consists essentially of fused silica flour and silicon carbide stucco and the seal dip layers consist essentially of a material selected from the group consisting of alumina and zircon flour.

9. A shell for investment casting metals and alloys, comprising:

a facecoat;

plural backup layers comprising at least one interior backup layer and at least one intermediate backup layer, the facecoat and interior backup layer or layers defining a portion of a shell having a first coefficient of thermal expansion, and wherein the at least one intermediate backup layer comprises a material capable of undergoing a volumetric transformation during cool down; and as many seal dip layers as facecoat and interior backup layer or layers combined, the seal dip layers defining a portion of a shell having a second coefficient of thermal expansion that is substantially similar to the first coefficient of thermal expansion.

10. The shell according to claim 9 wherein the facecoat comprises a flour selected from the group consisting of graphite, alumina, rare earth metal oxides, doped rare earth metal oxides, and mixtures thereof.

11. The shell according to claim 9 wherein the facecoat comprises a flour selected from the group consisting of graphite, alumina, zirconia, yttria, thoria, fused yttria, calcined yttria-vanadia, yttria-zirconia, yttria-alumina, and mixtures thereof.

12. The shell according to claim 11 wherein the facecoat consists essentially of an alumina flour.

13. The shell according to claim 9 wherein plural intermediate backup layers comprise a material capable of undergoing a volumetric transformation during cool down.

14. The shell according to claim 13 wherein the plural intermediate backup layers comprise fused silica flour and silicon carbide stucco.

15. The shell according to claim 9 wherein the at least one intermediate backup layer comprises a flour selected from the group consisting of fused silica, cristobalite, quartz, tridymite, zirconia, and mixtures thereof.

16. The shell according to claim 9 wherein the at least one intermediate backup layer comprises fused silica flour.

17. The shell according to claim 16 wherein the at least one intermediate backup layer further comprises silicon carbide stucco.

18. The shell according to claim 9 wherein the first coefficient of thermal expansion varies from the second coefficient of thermal expansion by from about 0 to about 10 percent.

19. The shell according to claim 9 wherein the seal dip layers comprise a flour selected from the group consisting of alumina, zircon, zirconia, quartz, silica, yttria, titania, fused yttria-zirconia, fused yttria-alumina, and mixtures thereof.

20. The shell according to claim 9 wherein the facecoat comprises a material selected from the group consisting of alumina and zirconia flour and wherein the seal dip comprises a material selected from the group consisting of alumina and zircon flour.

21. The shell according to claim 9 wherein the facecoat comprises an alumina flour and an alumina stucco, and the seal dip comprises alumina flour.

22. The shell according to claim 9 wherein the facecoat consists essentially of alumina flour and alumina stucco, at least one interior backup layer consists essentially of alumina flour and alumina stucco, at least one intermediate backup layer consists essentially of fused silica flour and silicon carbide stucco, and the seal dip layers consist essentially of a material selected from the group consisting of alumina and zircon flour.

23. A shell for investment casting brittle metals and alloys, comprising:
a facecoat comprising a flour selected from the group consisting of graphite, alumina, zirconia, yttria, thoria, fused yttria, calcined yttria-vanadia, yttria-zirconia, yttria-alumina, and mixtures thereof;
plural interior backup layers wherein the facecoat and plural interior backup layers define a portion of a shell having a first coefficient of thermal expansion;
plural intermediate backup layers comprising a flour different from that used to form the plural interior backup layers, and wherein at least one of the plural intermediate backup layers comprises a material capable of undergoing a volumetric transformation during cool down; and
as many seal dip layers as the facecoat plus interior backup layers combined, the seal dip layers defining a portion of the shell having a second coefficient of thermal expansion wherein the first coefficient of thermal expansion and the second coefficient of thermal expansion vary by from about 0 to about 10 percent.

24. The shell according to claim 23 wherein the facecoat comprises a flour selected from the group consisting of alumina, yttria, zirconia, and mixtures thereof.

25. The shell according to claim 23 wherein the facecoat comprises alumina flour.

26. The shell according to claim 25 wherein the plural interior backup layers comprise alumina flour and alumina stucco.

27. The shell according to claim 23 wherein the plural interior backup layers comprise alumina flour and alumina stucco.

28. The shell according to claim 23 wherein plural intermediate backup layers comprise a material capable of undergoing a volumetric transformation during cool down.

29. The shell according to claim 28 wherein the plural intermediate backup layers comprise fused silica flour and silicon carbide stucco.

30. The shell according to claim 23 wherein the at least one intermediate backup layer comprises a flour selected from the group consisting of fused silica, cristobalite, quartz, tridymite, zirconia, and mixtures thereof.

31. The shell according to claim 23 wherein the at least one intermediate backup layer comprises fused silica flour and silicon carbide stucco.

32. The shell according to claim 23 wherein the first coefficient of thermal expansion varies from the second coefficient of thermal expansion by from about 1 to about 7 percent.

33. The shell according to claim 23 wherein the first coefficient of thermal expansion varies from the second coefficient of thermal expansion by from about 1 to about 5 percent.

34. The shell according to claim 23 wherein the seal dip layers comprise a flour selected from the group consisting of alumina, zircon, zirconia, quartz, silica, yttria, titania, fused yttria-zirconia, fused yttria-alumina, and mixtures thereof.

35. The shell according to claim 23 wherein the facecoat comprises a flour selected from the group consisting of alumina, yttria, zirconia, and mixtures thereof, and wherein the seal dip layers comprise a same flour material as used to form the facecoat.

36. The shell according to claim 23 wherein the facecoat comprises an alumina flour and an alumina stucco, and wherein the seal dip comprises an alumina flour.

37. The shell according to claim 23 wherein the facecoat consists essentially of alumina flour and alumina stucco, the plural interior backup layers consist essentially of alumina flour and alumina stucco, the plural intermediate backup layers consist essentially of fused silica flour and silicon carbide stucco, and the seal dip layers consist essentially of a material selected from the group consisting of alumina and zircon flour.

38. A shell for investment casting brittle metals and alloys, comprising:
a facecoat comprising an alumina flour and alumina stucco;
plural interior backup layers comprising alumina flour and alumina stucco, the facecoat and plural interior backup layers defining a portion of a shell having a first coefficient of thermal expansion;
plural intermediate backup layers comprising fused silica flour and silicon carbide stucco; and
as many seal dip layers as the facecoat plus interior backup layers combined, the seal dip layers comprising an alumina or zircon flour, the seal dip layers also defining a portion of the shell having a second coefficient of thermal expansion wherein the first coefficient of thermal expansion and the second coefficient of thermal expansion vary by from about 0 to about 10 percent.

39. The shell according to claim 38 wherein the facecoat consists essentially of alumna flour and alumina stucco, the plural intermediate backup layers consist essentially of fused silica flour and silicon carbide stucco, and the seal dip layers consist essentially of a material selected from the group consisting of alumina and zircon flour.

40. A shell for investment casting metals and alloys, comprising:

at least one shell layer comprising a material capable of undergoing a volumetric transformation;

underlying layers that underlie the at least one shell layer capable of undergoing a volumetric transformation, the underlying layers defining a first portion of the shell; and overlying layers that overlie the at least one shell layer capable of undergoing a volumetric transformation, the overlying shell layers defining a second portion of the shell wherein the first and second portions of the shell have substantially similar coefficients of thermal expansion.

41. The shell according to claim 40 and further comprising plural layers capable of undergoing a volumetric transformation.

42. The shell according to claim 40 wherein the at least one layer capable of undergoing a volumetric transformation consists essentially of fused silica flour and silicon carbide stucco.

43. The shell according to claim 40 wherein the underlying layers consist essentially of alumina flour and alumina stucco.

44. The shell according to claim 40 wherein the overlying layers consist essentially of a material selected from the group consisting of zircon flour, alumina flour, and mixtures thereof.

45. A method for investment casting TiAl, comprising:

providing a shell having an alumina facecoat, plural backup layers and at least one seal dip layer;

providing molten TiAl inside the shell; and allowing the molten TiAl to solidify inside the shell to form a casting.

46. The method according to claim 45 wherein the plural backup layers comprise at least one interior backup layer and at least one intermediate backup layer, the facecoat and interior backup layer or layers defining a portion of a shell having a first coefficient of thermal expansion, the shell further comprising as many seal dip layers as facecoat and interior backup layer or layers combined, the seal dip layers defining a portion of a shell having a second coefficient of thermal expansion that is substantially similar to the first coefficient of thermal expansion.

47. The method according to claim 45 wherein at least one of the plural backup layers comprises a material capable of undergoing a volumetric transformation during cool down.

48. The method according to claim 47 wherein the at least one backup layer comprises a flour selected from the group consisting of fused silica, cristobalite, quartz, tridymite, zirconia, and mixtures thereof.

49. The method according to claim 45 wherein plural backup layers comprise a material capable of undergoing a volumetric transformation during cool down.

50. The method according to claim 49 wherein at least one of the plural backup layers comprises fused silica flour and silicon carbide stucco.

51. A method for investment casting metals and alloys, comprising:

providing a shell having a facecoat, plural backup layers comprising at least one interior backup layer and at least one intermediate backup layer, the at least one intermediate backup layer being capable of undergoing a volumetric transformation during cool down, the facecoat and interior backup layers defining a portion of a shell having a first coefficient of thermal expansion, and as many seal dip layers as facecoat and interior backup layers combined, the seal dip layers defining a portion of a shell having a second coefficient of thermal expansion that is substantially similar to the first coefficient of thermal expansion;

providing a molten material selected from the group consisting of metals and alloys inside the shell; and allowing the molten material to solidify inside the shell to form a casting.

52. The method according to claim 51 wherein the shell further includes plural intermediate backup layers comprising a material capable of undergoing a volumetric transformation during cool down.

53. The method according to claim 52 wherein the plural intermediate backup layers comprise a flour selected from the group consisting of fused silica, cristobalite, quartz, tridymite, zirconia, and mixtures thereof.

54. The method according to claim 52 wherein the plural intermediate backup layers comprise fused silica flour and silicon carbide stucco.

55. The method according to claim 51 wherein the at least one intermediate backup layer comprises fused silica flour.

56. The method according to claim 55 wherein the at least one intermediate backup layer further comprises silicon carbide stucco.

57. The method according to claim 51 wherein the first coefficient of thermal expansion varies from the second coefficient of thermal expansion by from about 0 to about 10 percent.

58. The method according to claim 51 wherein the facecoat comprises a flour selected from the group consisting of graphite, alumina, zirconia, yttria, thoria, fused yttria, calcined yttria-vanadia, yttria-zirconia, yttria-alumina, and mixtures thereof.

59. The method according to claim 51 wherein the facecoat comprises alumina and the molten material is selected from the group consisting of aluminides.

60. The method according to claim 51 wherein the facecoat comprises alumina, and the molten material comprises TiAl.

61. The method according to claim 51 wherein the facecoat and the interior backup layers comprise alumina flour and alumina stucco, the intermediate backup layers comprise fused silica flour and silicon carbide stucco, and the seal dip layers comprise alumina or zircon flour.

62. A method for casting metals and alloys, comprising:

providing a shell comprising (a) an alumina facecoat, (b) at least one interior backup layer wherein the facecoat and the at least one interior backup layer define a portion of a shell having a first coefficient of thermal expansion, (c) plural intermediate backup layers wherein at least one of the plural intermediate backup layers comprises a material capable of undergoing a volumetric transformation during cool down, and (d) as many seal dip layers as the facecoat and interior backup layers combined, the seal dip layers defining a portion of the shell having a second coefficient of thermal expansion wherein the first coefficient of thermal expansion and the second coefficient of thermal expansion vary by from about 0 to about 10 percent;

providing molten material selected from the group consisting of metals and alloys inside the shell;

solidifying the molten material inside the shell to form a casting; and separating the shell from the casting.

63. The method according to claim 62 wherein the shell includes plural interior backup layers comprising an alumina flour.

64. The method according to claim 62 wherein the plural intermediate backup layers comprise a flour selected from the group consisting of fused silica, cristobalite, tridymite, quartz, zirconia, and mixtures thereof.

65. The method according to claim 64 wherein the plural intermediate backup layers comprise fused silica flour and silicon carbide stucco.

66. The method according to claim 64 wherein the plural intermediate backup layers comprise fused silica flour and silicon carbide stucco, and wherein the seal dip layers comprise a material selected from the group consisting of alumina and zircon flour.

67. A method for casting metals and alloys, comprising:

providing a shell comprising (a) at least one shell layer comprising a material capable of undergoing a volumetric transformation during casting or cool down, (b) underlying shell layers that underlie the at least one shell layer capable of undergoing a volumetric transformation during casting or cool down, the underlying shell layers defining a first portion of the shell, and (c) overlying shell layers that overlie the at least one shell layer capable of undergoing a volumetric transformation during casting or cool down, the overlying shell layers defining a second portion of the shell wherein the first and second portions of the shell have substantially similar coefficients of thermal expansion;

providing molten metal or alloy inside the shell;

solidifying the molten metal or alloy inside the shell to form a casting; and separating the shell from the casting.

\* \* \* \* \*